(12) United States Patent
Teichman et al.

(10) Patent No.: US 11,720,004 B2
(45) Date of Patent: Aug. 8, 2023

(54) CAMERA GIMBAL AND ASSOCIATED METHOD OF USE

(71) Applicant: CINEMA DEVICES, INC., San Fernando, CA (US)

(72) Inventors: Adam Teichman, Los Angeles, CA (US); Charles Papert, Los Angeles, CA (US)

(73) Assignee: CINEMA DEVICES, INC., San Fernando, CA (US)

(*) Notice: Subject to any disclaimer, the term of this patent is extended or adjusted under 35 U.S.C. 154(b) by 0 days.

(21) Appl. No.: 17/222,149

(22) Filed: Apr. 5, 2021

(65) Prior Publication Data

US 2022/0317551 A1    Oct. 6, 2022

(51) Int. Cl.
*G03B 17/56* (2021.01)
*F16M 11/12* (2006.01)

(52) U.S. Cl.
CPC .......... *G03B 17/561* (2013.01); *F16M 11/12* (2013.01); *G03B 17/566* (2013.01)

(58) Field of Classification Search
CPC . F16M 11/2071; G03B 17/561; G03B 17/566
See application file for complete search history.

(56) References Cited

U.S. PATENT DOCUMENTS

| | | | | |
|---|---|---|---|---|
| 4,208,028 A * | 6/1980 | Brown | ................... | G03B 13/00 |
| | | | | 396/421 |
| 4,474,439 A * | 10/1984 | Brown | ................... | F16M 11/10 |
| | | | | 396/428 |
| 8,485,740 B1 * | 7/2013 | Chapman | ........... | F16M 11/2071 |
| | | | | 396/428 |
| 2002/0088907 A1 * | 7/2002 | Phillips | .................. | F16M 11/16 |
| | | | | 248/431 |
| 2018/0106425 A1 * | 4/2018 | Brown | ................... | F16M 11/10 |

FOREIGN PATENT DOCUMENTS

WO    WO-9615404 A1 *    5/1996    ......... F16M 11/2021

OTHER PUBLICATIONS

Flowcine Twitter Post at https://twitter.com/Flowcine/status/378652250932903936 (Year: 2013).*
Camera Revolution Mini Libre product page at https://camerarevolution.com/equipment/mini-libra/ (Year: 2018).*

(Continued)

*Primary Examiner* — Leon W Rhodes, Jr.
(74) *Attorney, Agent, or Firm* — R. Neil Sudol; Henry D. Coleman

(57) ABSTRACT

A camera support includes a post, a gimbal assembly, and a mounting member. The mounting member couples the gimbal assembly to the post for rotation of the gimbal assembly about a pan axis coincident with a longitudinal axis of symmetry of the post. The gimbal assembly includes a roll cradle, a tilt body and a second mounting member. The roll cradle is movably secured to the first mounting member for rotation about a roll axis perpendicular to the pan axis. The tilt body is movably mounted to the roll cradle for rotation about a tilt axis perpendicular to both the pan axis and the roll axis. The second mounting member is connected to the tilt body for attaching a camera to the tilt body.

18 Claims, 8 Drawing Sheets

(56) References Cited

OTHER PUBLICATIONS

Flowcine Gravity One product page at https://www.flowcine.com/documentation/gravity-one/ (Year: 2020).*
Flowcine Gravity One documentation (Year: 2020).*
"ZeeGee—A new Approach to the hand-held Look", https://www.newsshooter.com/2021/04/21/zeegee-a-new-approach-to-the-hand-held-look/ (Year: 2021).*
The Betz Twister product page at https://www.betz-tools.com/en/twister.php (Year: 2020).*
Screen captures from Cartoni—Lambda 25 Setup video at https://www.youtube.com/watch?v=sjtPBXhuEtw, dated Aug. 4, 2017. (Year: 2017).*
Urbanfox.tv Blog "Cartoni swings nodal head towards 3D" at http://urbanfoxtv.blogspot.com/2010/09/cartoni-swings-nodal-head-towards-3d.html ; dated Sep. 27, 2010 (Year: 2010).*
"What's Up Doc? Meet Matthews' New Docking Stand" <https://www.msegrip.com/blogs/matthnews/what-s-up-doc-meet-matthews-new-docking-stand> (Year: 2020).*

\* cited by examiner

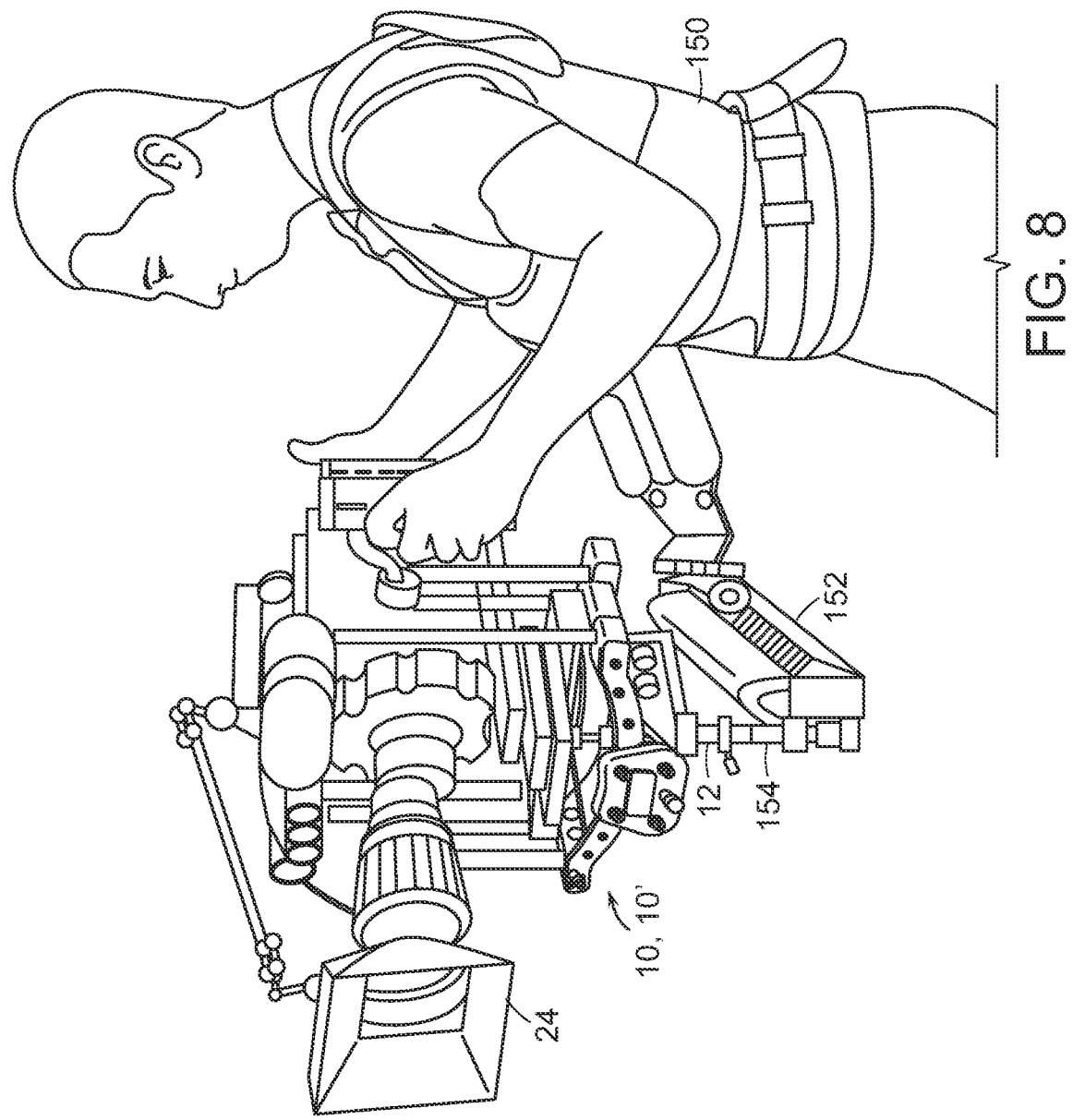

CAMERA GIMBAL AND ASSOCIATED METHOD OF USE

BACKGROUND OF THE INVENTION

This invention relates to a support for a camera, particularly a video or motion picture camera. More specifically, the present invention relates to a multiple-axis gimbal system. The invention also relates to an associated method of using the support or gimbal system.

Movie and television production has seen a growing popularity of handheld operation because of the unique dramatic look it offers the audience. Typically, handheld video and motion picture cameras have support systems (e.g. Steadicams, dollies) to address limitations of handheld camera equipment. The Steadicam is the most popular camera stabilization system currently in use. The Steadicam eliminates effects of the operator's movement on the image capture process, so that shooting is smooth and continuous, even when the operator walks or rides over bumpy ground or on stairs.

The operating principle of an original Steadicam utilizes a purely mechanical unmotorized three axis gimbal that attaches to a counterweighted post that is generally operated bottom heavy to produce a stabilized platform that can be manually influenced by the hand of the operator to frame a shot. The Steadicam utilizes weight, mass, and inertia for stabilization. A more recent model of the Steadicam utilizes motorized assist.

On some of the three axis gimbals on the market, the motors can be turned off for free hands on operation, but they are not designed for this purpose and do not have ergonomically positioned handgrips for this function.

Conventional three-axis gimbals have different arrangements for isolating the axes from each other and from operator movement. The vast majority of such gimbals are motorized. Amongst the products on the market that achieve this is the Libra head, which utilizes the same relationship of the pan access at the mount point with a cradle to handle axis roll at the next stage and the tilt axis at the final stage. This is a motorized gimbal only for angular stabilization and camera adjustment.

The control of handheld-camera motions with existing equipment can require significant experience and skill for smoothness of motion, particularly when motion is desired in more than one angular direction.

SUMMARY OF THE INVENTION

A camera support or gimbal system comprises, in accordance with the present invention, a post, a gimbal assembly, and a first mounting member. The mounting member couples the gimbal assembly to the post for rotation of the gimbal assembly in a horizontal plane about a first axis coincident with a longitudinal axis of symmetry of the post, which is configured for vertical orientation or the first axis. The gimbal assembly includes (i) a first rigid body having a periphery, (ii) a second rigid body and (iii) a second mounting member. The periphery of the first rigid body is movably secured to the first mounting member for rotation of the first rigid body in a vertical plane about a second axis perpendicular to the first axis. The second rigid body is axially mounted to the first rigid body for rotation in another vertical plane about a third axis perpendicular to both the first axis and the second axis. The second mounting member is connected to the second rigid body for attaching a camera to the second rigid body. Thus the gimbal assembly is mounted to the post proximate and along the first axis, while the first rigid body is movably secured to the first mounting member at a distance from the second axis, at the periphery of the first rigid body, and the second rigid body is mounted to the second rigid body proximate to and along the third axis.

The gimbal assembly is configured for the application solely of manual force or torque to rotate (i) the gimbal assembly in its entirety about the first axis, (ii) the first rigid body and the second rigid body, together with the camera attached to the second rigid body, about the second axis, and (iii) the second camera member and the camera alone about the third axis. The gimbal assembly includes a handgrip (such as a knob or a door-type handle) attached to the second rigid body for applying torque to rotate same about the third axis, to rotate the first rigid body and the second rigid body together about the second axis, and for rotating the gimbal assembly about the first axis, selectively in any combination of the rotary motions.

Preferably, the camera support further comprises two bearing members spaced from one another along the third axis (preferably a tilt axis). The bearing members each include a casing that houses a respective rotary bearing. The second rigid body is rotatably mounted by at least one axle to the bearing members for rotation of the second rigid body (with the camera) by the handgrip about the third axis. The first rigid body is rigidly fixable to the bearing members and particularly the casings thereof. The first rigid body includes at least two first arms parallel to one another and spaced from one another in a direction parallel to the third axis. Those first arms have adjustable effective positions in a direction transverse to the third axis for shifting a first center of gravity, of the first rigid body, the second rigid body and the camera together, relative to the second axis, thereby enabling a placement of the first center of gravity on the second axis. The second rigid body includes two second arms parallel to one another and spaced from one another in a direction parallel to the third axis. The two second arms have adjustable effective positions transverse to the third axis for shifting a second center of gravity, of the second rigid body and the camera, relative to the third axis, thereby enabling a placement of the second center of gravity on the third axis.

The ability for a user to position the centers of gravity on the second and third rotation axes enables the user to balance the entire camera support system so as to enable a sensitive and responsive adjustability. Thus the camera support can accommodate cameras of different weight distributions and sizes, as well as lens substitutions, so that the camera can be moved with smooth and continuous ease to execute any desired combination of rotation about the three axes of pan, roll and tilt. In applicant's preferred embodiment of a camera support or gimbal system, the second rigid body or structure is a swing or tilt body and is located innermost, inside the first rigid body, which is a roll cradle with peripheral support and a rocking motion, while the latter is movably attached to a mount on the pan axis or bearing member.

Pursuant to a feature of the present invention, each of the two arms of the second rigid body (e.g., swing or tilt structure) is part of a respective telescoping suspension member. An outer tube may be adjustably connected to a respective third-axis axle while an inner tube has a screw knob control for fine adjustment of a degree of telescoping of the suspension member, that is, a degree of overlap of the outer tube and the inner tube.

The arms of the first rigid body (e.g., roll cradle) may be releasably clamped to the casings of the bearing members.

In a preferred embodiment of the present invention, the handgrip of the camera support or gimbal system is connected to the tilt or second rigid body so that rotation of the handgrip about the third (tilt) axis rotates the tilt body and the camera about the tilt axis. Moving the handgrip in a plane perpendicular to the first (pan) axis rotates the gimbal assembly about the pan axis. Moving the handgrip in a plane including the pan axis rotates the first rigid body or roll cradle, the tilt body and the camera about the second or roll axis. The gimbal assembly is configured for any combination of rotation about the pan axis, the roll axis and the tilt axis in response to manipulation of the gimbal assembly via the handgrip. The handgrip may be one of two handgrips or handles, which may be removably attached to the gimbal assembly for enabling substitution of different forms of manual engagement.

In the preferred embodiment of the present invention, the roll cradle and the first mounting member include cooperating structure defining an arcuate track with a center of curvature located along or on the roll axis. The structure preferably includes two parallel arcuate rails, at the periphery of the roll cradle and thus spaced from the roll axis, each rail with a center of curvature coincident with the roll axis. More preferably, the two parallel arcuate rails are unitary with the roll cradle and movably supported on the first mounting member. In that case the first mounting member is preferably provided with a plurality of rollers or wheels, the two parallel arcuate rails being supported on respective ones of the rollers or wheels.

In the preferred embodiment of the present invention, the first mounting member has a U-shaped configuration with a base or bight part and two parallel lateral plates connected to the base or bight part along opposing sides thereof, the post being coupled to the base or bight part for rotation of the gimbal assembly about the pan axis. Each of the two parallel lateral plates may be provided on a surface facing the other of the two parallel lateral plates with a plurality of the rollers or wheels, the roll cradle being supported on the rollers. Thus the roll body or cradle has peripheral support, while the gimbal assembly finds axial support for rotation about the pan axis and the tilt body has axial support at the tilt axis.

Pursuant to an additional feature of the present invention, the second rigid body or tilt body has a U-shaped configuration. More specifically, the tilt body includes a base or bight part and two arms connected to the base or bight part at opposite ends thereof. The second mounting member is affixed to the base or bight part of the tilt body, between the arms thereof. The second mounting member is typically called a "stage" and provides for adjustability in the location of the camera on the tilt body's base or bight part. This permits compensation for different weight distributions of various cameras, placing the center of mass of the camera in the center of the tilt body's base or bight part.

Preferably, at least one handle or manual grip is provided, which is fixedly connected to the tilt body and rotatably connected to the roll cradle for facilitating manual rotation of the tilt body about the third axis. Moreover, the handle or grip is fixed to a tilt axle rotatably journaled in bearings fixable relative to the roll cradle, facilitating manual rotation of the roll cradle and the tilt body, as well as the camera, jointly about the roll axis and for further facilitating manual rotation of the gimbal assembly about the pan axis.

Preferably, the roll cradle and the tilt body each have a U-shaped configuration. Thus, each of the rotatable bodies includes a base or bight part and two arms connected to the base or bight part at opposite ends thereof. The tilt body is smaller than and contained within the roll cradle. The arms of the tilt body are located on or against mutually facing sides of the roll cradle's arms and are rotatably connected thereto. The base or bight part of the roll cradle includes the above-described two parallel arcuate rails along opposite sides of that base or bight part.

A camera support in accordance with the present invention is particularly adapted for use in video and cinematographic production, particularly in television filming and feature-film camera work. A method pursuant to the invention comprises providing a harness, removably attaching the harness to an individual user, where the harness includes a support or coupling member with a bore or recess. One inserts the post of the present camera support into the bore or recess, thereby mounting the camera support to the harness. One attaches a camera to the tilt body, either before or after the mounting of the camera support to the harness. The camera is operated to capture a series of images, and the user manually moves the gimbal assembly about at least one of the first axis, the second axis and the third axis during the operating of the camera. The present invention enables a movement combining rotation along any combination of the axes, using the one handle or grip. Handles may be provided on both sides of the gimbal assembly for simultaneous or alternate manipulation in controlling the motion of the camera to produce various combinations of panning, rolling and tilting.

The present invention provides a unique gimbal system that enables balancing a video movie camera (digital or film) in all three axes. The camera easily pivots around the center of gravity and is controlled with a light touch to one or both of a pair of handles. The result combines the desired handheld production look with well-established portable or fixed support and stabilization systems.

The camera support system of the present invention improves portable handheld-style operation and is particularly useful as an accessory to existing camera support systems. A camera support as described herein is compatible with virtually any existing camera support and stabilization system. The present invention enhances the control of the operator over camera movement.

A camera support pursuant to the invention allows a Steadicam user to perform handheld production, something that cannot be done today. The invention also offers several advantages over traditional shoulder mounted handheld operation.

In contrast to standard shoulder-mounted operation with cameras weighing up to 70 lbs., a camera support in accordance with the present invention transfers the entire load off the operator's shoulder and distributes it to the hips. This alleviates typical fatigue and will allow operators to shoot for longer periods.

Instead of being limited to shoulder-mounted height, a camera support in accordance with the present invention leverages the existing boom range of a Steadicam arm the operator owns. This expands the use from shoulder height alone to whatever range the Steadicam arm offers, typically about 30 inches.

By combining the handheld look with the advantage of Steadicam stabilization, the film an video shooting is free of unwanted footsteps typically seen in handheld operation. In almost all cases where the handheld look is desired, footsteps are almost always unwanted. The Steadicam has successfully been used to remove footsteps since its introduction over 40 years ago. The present camera support can serve as an accessory to replace the traditional post or "Sled" of a Steadicam.

In this mode, a camera support in accordance with the present invention can provide a handheld look with existing dolly- or other floor-mounted systems. This offers filmmakers a low profile, a lightweight head that yields a handheld look but with the precision of a dolly. The highly reactive capabilities of a camera support in accordance with the present invention is ideal for stunt and fight sequences that require fast camera movement. This will make it much easier to manage complex moves than it is currently and without any camera weight being supported by the operator's shoulders and back.

A camera support in accordance with the present invention is built around the principle of a three-axis mechanical gimbal isolation of the roll, pitch, and yaw axes (pan, tilt, and horizon roll). The present camera support is designed to be freely operated by the hands of the camera operator to position the shot and framing manually. The camera support has a universal post, which may be provided with a socket as warranted to mount on any Steadicam arm or any stand or adapter with a post of a standard diameter.

The invention contemplates a free floating multiple-axis gimbal where the roll axis enables a neutral center of gravity with any length of camera and lens combination. The present camera support is operated by hand with hand grips preferably placed at the zero gravity point for the center knuckle of the hand in the midst of the grip without interference from the supporting driveshaft.

The post constitutes a docking stand that enables a user to dock the gimbal assembly on a Steadicam arm as well as be positioned over the camera for docking in an underslung position.

A camera support pursuant to a particular feature of the invention as described herein, comprises a post defining a first axis, a gimbal assembly coupled to the post for rotation about the first axis, wherein the gimbal assembly includes a rigid body rotatable about a second axis perpendicular to the first axis, wherein the rigid body has at least two arms extending parallel to one another and spaced from one another in a direction parallel to the second axis, and wherein the at least two arms have adjustable effective positions transverse to the second axis for shifting a center of gravity of the rigid body and a camera mounted thereto relative to the second axis, thereby enabling a placement of the center of gravity on the second axis. A related and synergistic feature resides in the adjustability of the location of the center of gravity of the roll cradle together with the tilt body and the camera supported thereby.

BRIEF DESCRIPTION OF THE DRAWINGS

FIG. 8 is a schematic perspective view showing mounting of a camera support or gimbal system in accordance with the present invention to a Steadicam harness.

DETAILED DESCRIPTION

Figure 1:
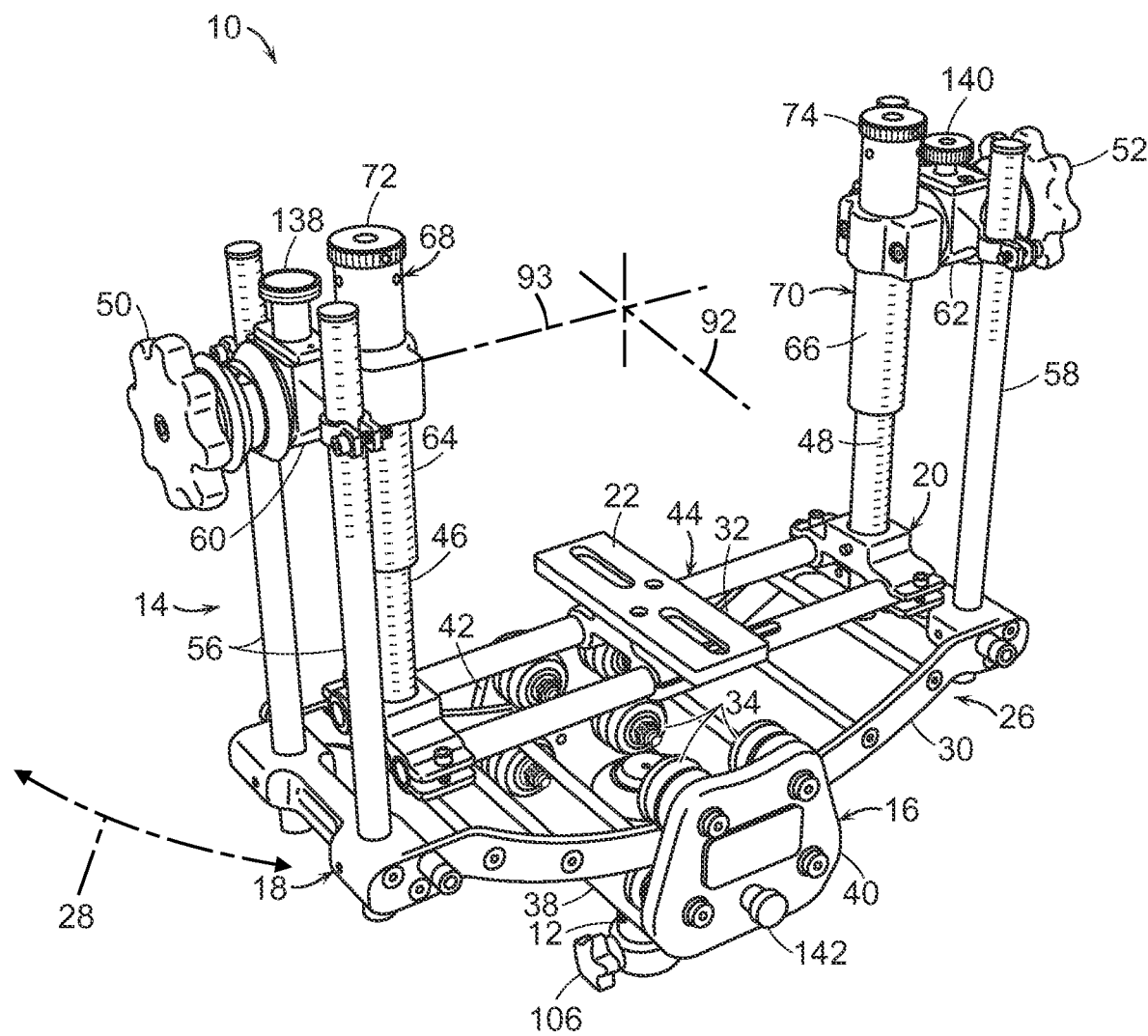
FIG. 1 is a top, right side and front perspective view of a camera support or gimbal system in accordance with the present invention, showing the support or gimbal system in a configuration for mounting to an upper end of a post, exemplarily of a Steadicam arm.
Figure 2:
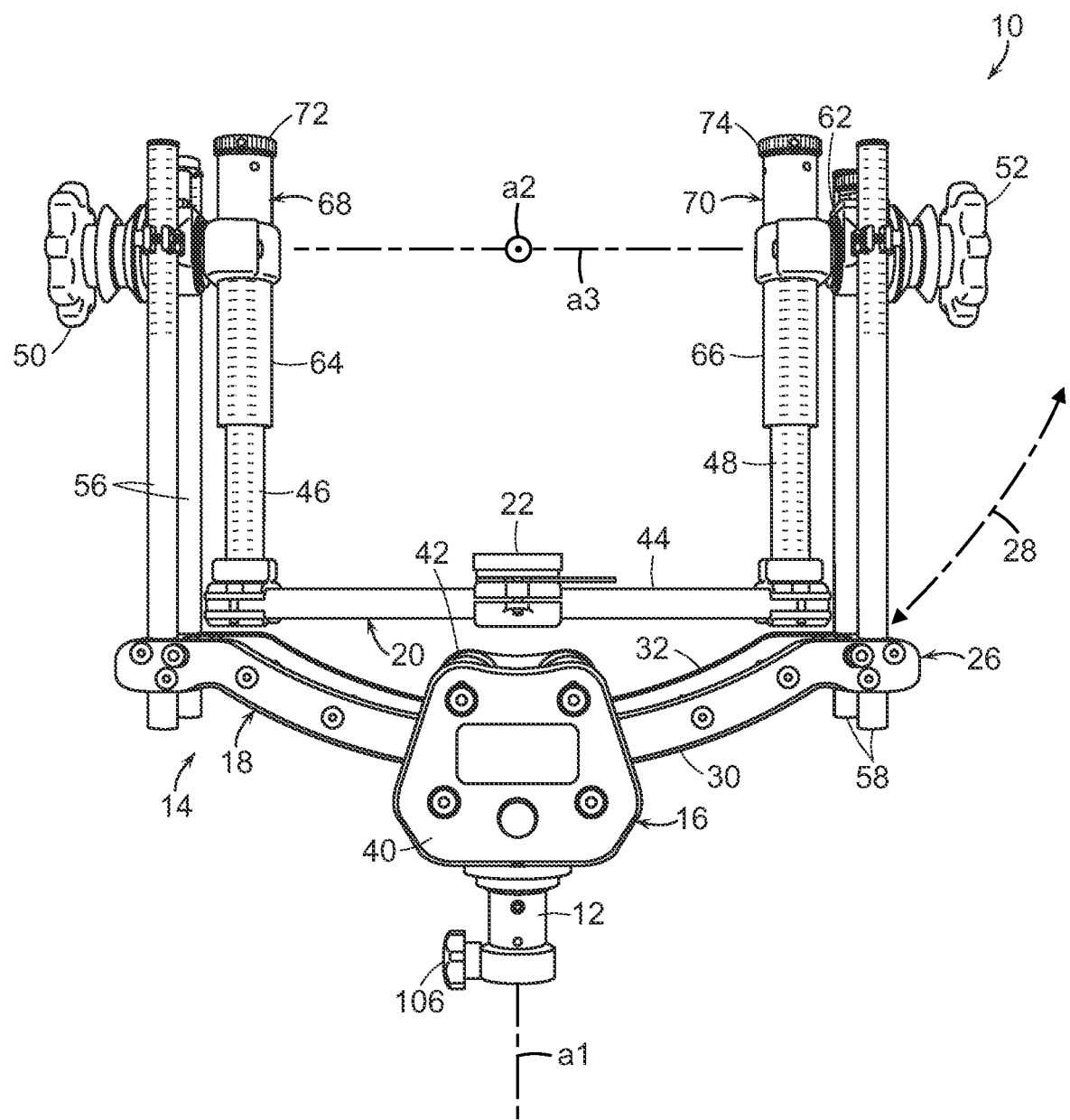
FIG. 2 is a front and left side perspective view of the camera support or gimbal system of FIG. 1.

As illustrated in the drawing, a camera support or multiple-axis gimbal system 10 comprises a tubular post 12, a gimbal assembly 14, and a first mounting member 16. Mounting member 16 couples gimbal assembly 14 to post 12 for rotation of the gimbal assembly about a pan axis a1 coincident with a longitudinal axis of symmetry of the post.

Gimbal assembly 14 includes a roll cradle or gimbal body 18, a tilt or gimbal body 20 and a second mounting member or stage 22. Roll cradle 18 is movably secured to the mounting member 16 for rotation about a roll axis a2 perpendicular to pan axis a1. Tilt body 20 is movably mounted to roll cradle 18 for rotation about a tilt axis a3 perpendicular to both pan axis a1 and roll axis a2. Mounting member or stage 22 is connected to tilt body 20 for attaching a camera 24 to the tilt body.

Roll cradle 18 and mounting member 16 include structure 26 defining an arcuate path of motion 28 with a center of curvature located along or on roll axis a2. Structure 26 preferably includes two parallel arcuate rails 30 and 32 with respective centers of curvature (not indicated) coincident with roll axis a2. Arcuate rails 30 and 32 are unitary with and part of roll cradle 18 and movably supported on mounting member 16. Mounting member 16 is provided with a plurality of rollers or wheels 34, arcuate rails 30 and 32 being supported on respective rollers or wheels 34. Roll cradle 18 is thus supported peripherally rather than axially, at a distance from the roll axis a2, rather than proximate to or along the roll axis.

Mounting member 16 has a U-shaped configuration with a base or bight part 38 and two parallel lateral plates 40 and 42 connected to the base or bight part along opposing sides thereof. Post 12 is coupled to base or bight part 38 for rotation of gimbal assembly 14 about pan axis a1. Each of the two parallel lateral plates 40 and 42 of mounting member 16 may be provided on bight-facing surfaces (not separately designated) with a plurality of the rollers or wheels 34. Roll cradle 18 is supported on rollers 34 for rotation about axis a2.

Tilt body 20 has a U-shaped configuration that includes a base or bight part 44 (comprising two parallel tubes, not designated) and two arms 46 and 48 connected to the base or bight part at opposite ends thereof. Stage 22 is affixed to base or bight part 44, between arms 46 and 48. Camera 24 is releasably mounted to stage 22 and slidable before fixing in order to located the center of mass of the camera at the midpoint of base or bight part 44, thereby ensuring a reference or base position that is horizontal rather than pointing downwardly in the case of front heavy or at the sky in the case of back heavy.

Two handgrips 50 and 52 in the form of knobs are fixedly connected to tilt body 20 on opposite sides thereof and, together with tilt body 20, are rotatably fixed to roll cradle 18 via a pair of bearing members 60 and 62. Turning knob 50 or 52 about tilt axis a3 rotates tilt body 20 and camera 24 about the tilt axis. Tilt body 20 is axially mounted on tilt axis a3.

Moving handgrip or knob 50 and/or 52 in a plane perpendicular to pan axis a1 rotates gimbal assembly 14 about the pan axis. Moving knob 50 and/or 52 in a plane including pan axis a1 rotates roll cradle 18, tilt body 20 and camera 24 about roll axis a2. Gimbal assembly 14 is configured for any combination of rotation about pan axis a1, roll axis a2 and tilt axis a3 in response to manipulation of gimbal assembly 14 via knob 50 and/or 52.

Like tilt body 20, roll cradle 18 has a U-shaped configuration with a base or bight part, namely, structure 26, and two pairs of arms 56 and 58 connected to the base or bight part at opposite ends thereof. Tilt body 20 is smaller than, and nested within, roll cradle 18. Arms 46 and 48 of tilt body 20 are located on, alongside or adjacent mutually facing sides of arms 56 and 58 of roll cradle 18 and are rotatably connected to arms 56 and 58, respectively. Base or bight part 54 of roll cradle 18 includes above-described parallel arcuate rails 30 and 32 along opposite sides.

Arms 56 and 58 have adjustable effective positions in a direction transverse to tilt axis a3 for shifting a combined center of gravity of roll cradle 18, tilt body 20 and camera 24 together, relative to roll axis a2, thereby enabling a placement of that center of gravity on the roll axis. Arms 46 and 48 of tilt body 20 extend parallel to one another and are mutually spaced in a direction parallel to tilt axis a3. Arms 46 and 48 have adjustable effective positions transverse to tilt axis a3 for shifting a center of gravity of roll cradle and camera 24 relative to tilt axis a3, thereby enabling a placement of this center of gravity on the tilt axis.

The adjustability in the locations of roll cradle 18 and tilt body 20 enables a user to position the centers of gravity on the roll and tilt axes a2 and a3 so as to balance the entire camera support system 10 so that panning, rolling and tilting of camera 24 can be accomplished with very little force and also provide for stable maintenance of the system configuration once the user terminates force application. Camera support or gimbal system 10 exhibits sensitivity, versatility and stability for cameras of different weight distributions and sizes, as well as for lens substitutions. With camera support or gimbal system 10, camera 24 can be moved with smooth and continuous ease to execute any desired combination of rotation about the three axes a1, a2, a3 of pan, roll and tilt. In system 10, tilt body 20 is located innermost, inside roll cradle 18, while the roll cradle is rotatably carried by mount 16 so that gimbal assembly 14 can rotate in its entirety about pan axis a1 or bearing post 12.

Arms 46 and 48 of tilt body 20 comprise inner parts or tubes movably disposed inside respective outer tubes 64 and 66 of telescoping suspension members 68 and 70. Outer tubes 64 and 66 are adjustably secured to respective axles (not shown, see 96 in FIG. 4) rotatably inserted in bearing members 60 and 62. Arms or inner tubes 46 and 48 each have a respective screw knob control 72 and 74 for fine adjustment of a degree of telescoping of suspension members 68 and 70, that is, a degree of overlap of outer tubes 64 and 66 and inner tubes or arms 46 and 48.

Arms 56 and 58 of roll cradle 18 may be releasably clamped to bearing members 60 and 62 and particularly casings or housings thereof (not separately designated) via flanged C-clamp and bolt assemblies 72 and 74. Bearing members 60 and 62 are adjustably fixable to respective sets of arms 56 and 58 to vary effective lengths of the arms between (i) a periphery of rigid body or structure 26 formed by rails 30 and 32 and (ii) the bearing members in a direction transverse to axis 93 for shifting a center of gravity of structure 26, tilt or gimbal body 20 and the camera relative to axis 92, thereby enabling a placement of center of gravity on axis 92. The changing of the effective lengths of arms 56 and 58 adjusts a position of axis 93 relative to axis 92.

Figure 3:
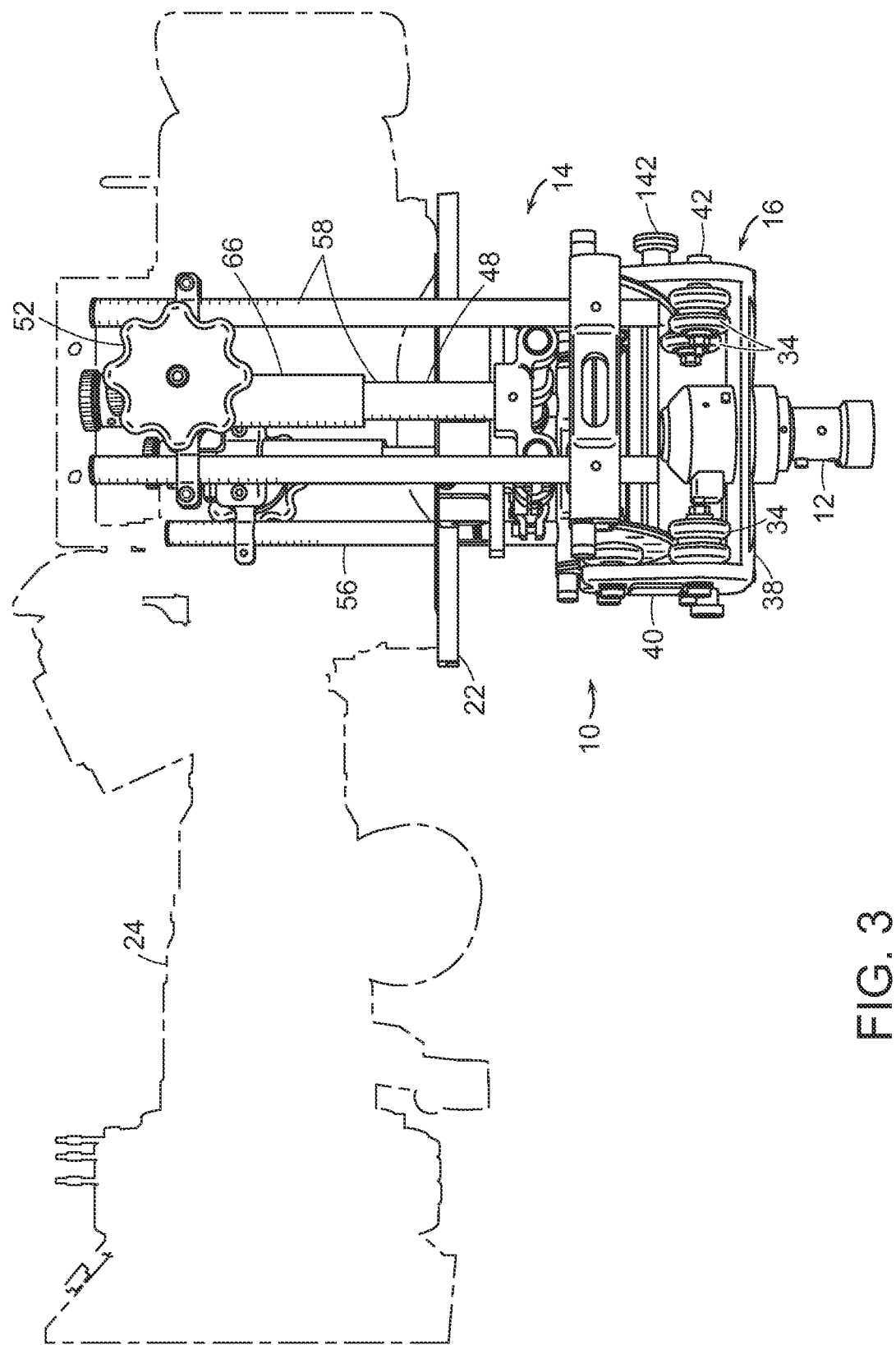
FIG. 3 is a left side elevational view of the camera support or gimbal system of FIGS. 1 and 2, showing a camera mounted to the support or gimbal.
Figure 4:
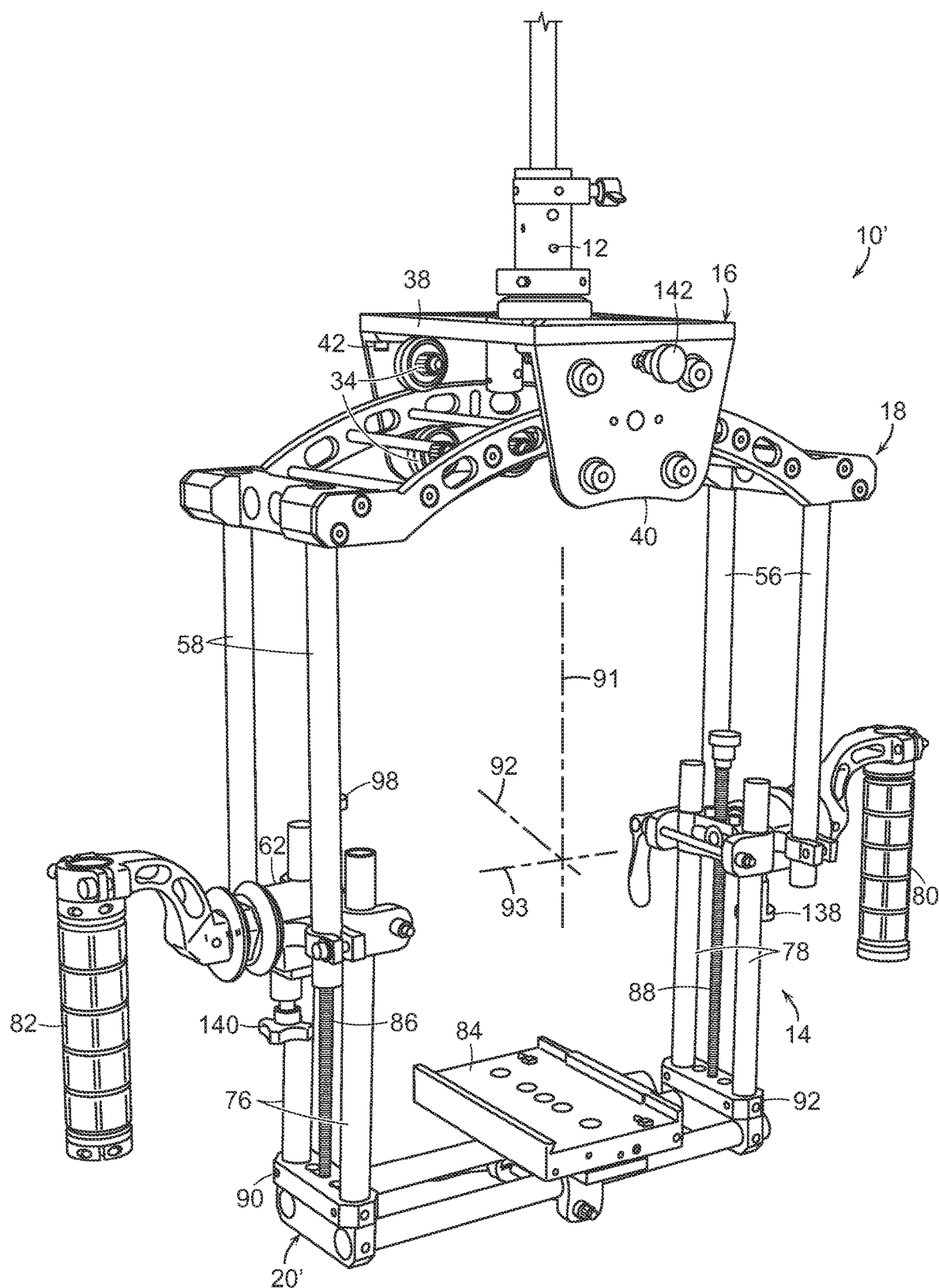
FIG. 4 is a top, right side and front perspective view of a modified camera support or gimbal system, showing the support or gimbal in an under-slung configuration for mounting to and suspending from a lower end of a tubular post. Like parts are designated by the same reference numerals as in FIGS. 1 and 2.

FIG. 4 illustrates an underslung mode of use of a modified camera support or gimbal system 10'. In the underslung position of FIG. 4, roll cradle 18 is swung up 180 degrees for mounting and suspending the camera 24 (see FIG. 3) under roll axis a2. Support or gimbal system 10' has a gimbal assembly 14' wherein telescoping suspension members 68 and 70 of system 10 are replaced in part with respective pairs of elongate tubes 76 and 78, forming a modified tilt or gimbal body 20', and handgrip knobs are replaced by handles 80 and 82. Handgrip knobs 50, 52 and handles 80, 82 may be removably attached to the respective axles of tilt body 20, 20' to enable substitution of the knobs and handles for one another. In system 10', a differently configured stage 84 replaces stage 22 of system 10. Both stages 22 and 84 are configured to accommodate adjustment of camera position both in a fore-and-aft direction and a side-to-side direction, thereby fine tuning the location of the combined center of gravity of tilt body 20, 20' and camera 24 relative to tilt axis a3.

Adjustability in the location of modified tilt body 20' relative to tilt axis a3 is accomplished via rods 86 and 88 threadingly engaging respective bight brackets 90 and 92 and respective cross-bars 94 (only one visible) of tilt body 20'. Cross-bars 94 rotatingly receive respective axles 96 (only one visible) of tilt body 20' while rods 86 and 88 have knobs 98, 100 for fine tuning manipulation by a user.

Figure 5:
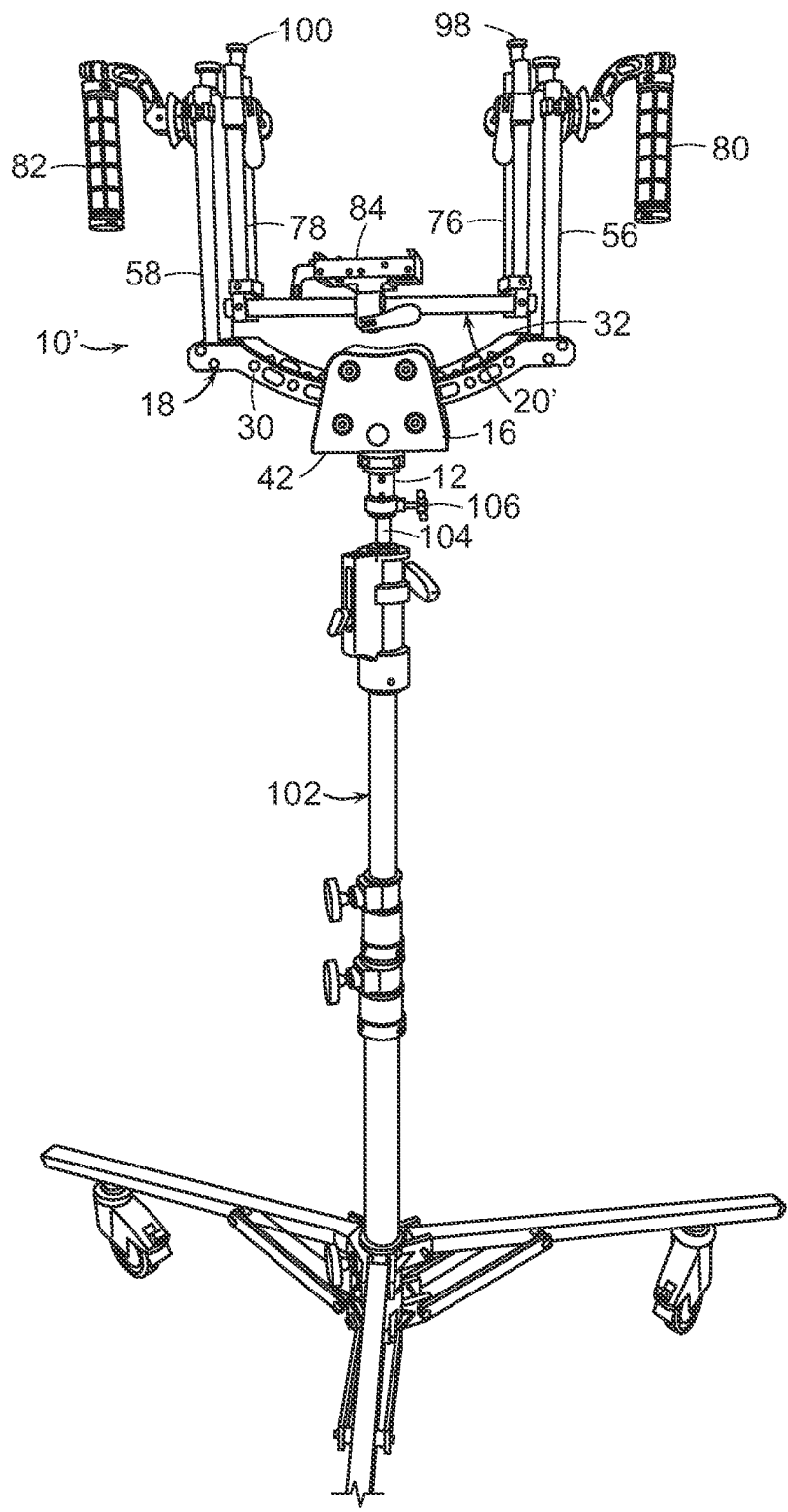
FIG. 5 is a top and front perspective view of the camera support or gimbal system of FIG. 4, showing the support or gimbal mounted to an upper end of a tripod.
Figure 6:
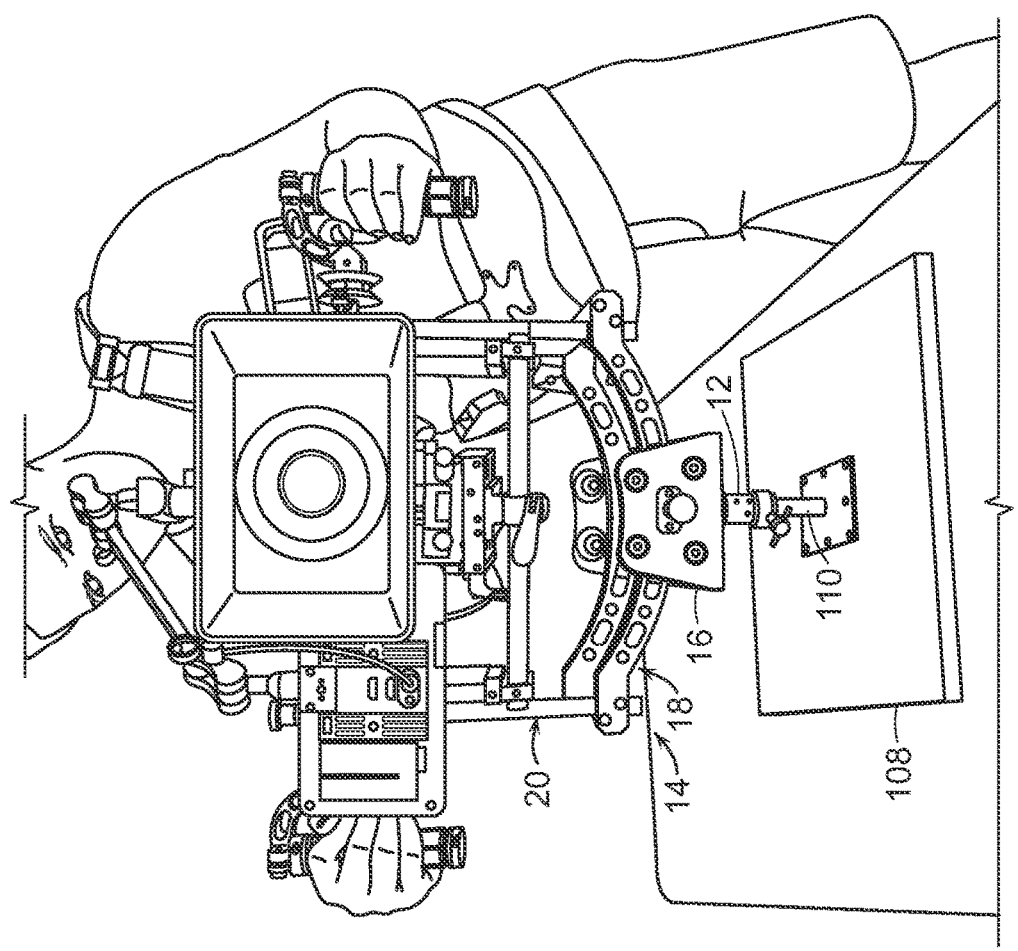
FIG. 6 is a top and front perspective view of the camera support or gimbal system of FIGS. 1 and 2, showing a camera on the support or gimbal which is removably attached to a post on a board for filming close to a floor surface, for example.

FIG. 5 shows camera support or gimbal system 10' placed atop a lighting stand 102 for television or motion picture film production. Post 12 (generally a tubular member but can be any geometry with a socket or recess) receives an upper end of a tube 104 of lightning stand 102, a set screw 106 being provided for releasably fixing post 12 to tube 104. Camera support or gimbal system 10, 10' with camera 24 attached thereto is mounted to lighting stand 102 during set lighting determinations, with a camera man being able to evaluate whether the lighting is optimal for a particular shot. The lighting stand 102 takes the weight of the camera 24 and gimbal system for set preparation prior to actual filming. When filming is about to commence, support or gimbal system 10, 10' and camera 24 are removed from stand 102 and attached to a Steadicam.

In film and television production, some scenes require shooting from a point of view close to a ground or floor surface. In that case, camera support or gimbal system 10, 10' together with camera 24 is mounted to a small platform 108, a so-called "beaver board" that is usually used for placement of lighting sources on film sets. Platform 108 has a tubular stub 110 of the same standard diameter as tube 104 of lighting stand 102. The mounting of system 10, 10' on platform 108 may take place with the platform disposed on a raised surface such as a table top. Thereafter, platform 108 together with system 10, 10' and camera 24 is placed on a low-lying surface for filming.

Figure 7:
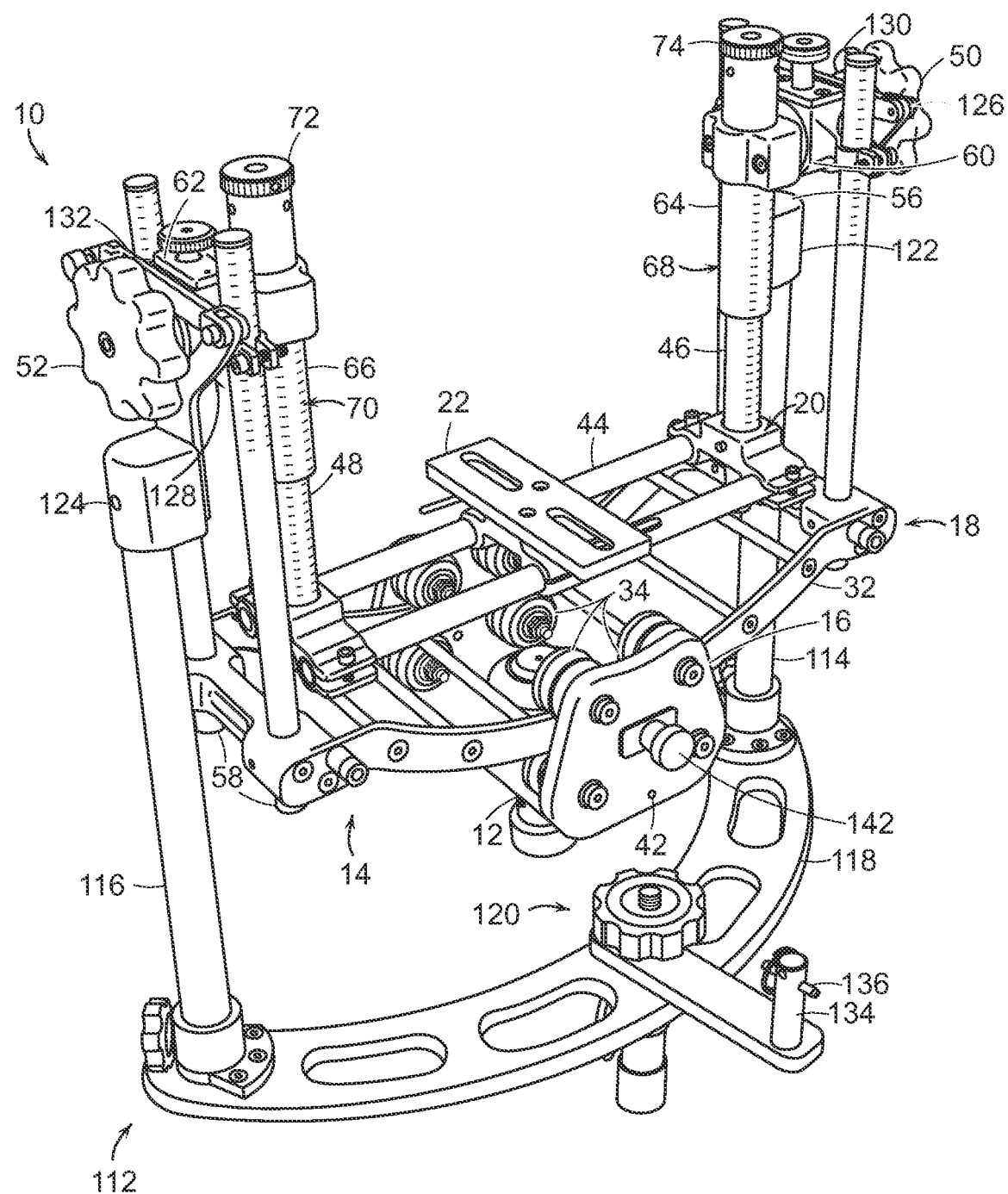
FIG. 7 is a top, left side and rear perspective view of the camera support or gimbal system of FIGS. 1 and 2, showing the support or gimbal system mounted to a docking stand.

In order to facilitate balancing of support or gimbal system 10, 10', for instance, to locate the centers of gravity of the system on roll and tilt axes a2 and a3, the system is attached to a docking stand 112 as illustrated in FIG. 7. It is to be noted that balancing is not typically required for the pan axis a1 owing to its vertical orientation even in the underslung mode of FIG. 4.

Docking stand 112 includes a pair of vertical uprights 114 and 116 fixed at their lower ends to opposite ends of an arcuate base 118. Base 118 may be temporarily mounted to a lighting stand or tabletop or other supporting structure via a fastening assembly 120. Docking stand 112 includes a pair of caps 122, 124 adjustably affixed to upper ends of uprights 114, 116 and carrying respective Y-shaped rests 126, 128 which receive tilt body axles 96. Rests 126 and 128 are provided with locking fingers 130, 132 hingedly attached to the upper end of one Y-leg. After the disposition of support or gimbal system 10, 10' (without camera 24) on docking stand 112, so that tilt body axles 96 are held on Y-shaped rests 126, 128, locking fingers 130, 132 are swung over the tilt body axles and releasably locked to the respective other Y-leg. To prevent rotation of the tilt body 20 about tilt axis a3, axles 96 are each provided with a flat 97 (see FIG. 4) that the respective locking finger 130, 132 abuts to arrest rotation of the axles 96. With the locking of fingers 130, 132, system 10, 10' is fixed against rotation around all three axes a1, a2, a3. Camera 24 is then mounted to stage 22, 84. To find a weight-centered position of camera 24 on stage 22, 84, locking fingers 130, 132 may be unlocked so that tilt body 20 with camera 24 thereon, may be free to move forward or back, tilting downwardly or upwardly in accordance with a fore or aft location of the camera's center of mass. Camera 24 may be as desired along stage 22, 84, for instance, to position the center of mass centrally on tilt body 20. Locking fingers 130, 132 may be locked to facilitate camera position modification.

Thereafter, telescoping suspension members 68 and 70 may be adjusted to place the center of gravity of tilt body 20 and camera 24 on tilt axis a3. To that end, locking fingers 130, 132 are released and the tilt body 20 with camera 24 is moved slight to detect balance offset. A large-scale or coarse adjustment is made by shifting the positions of outer tubes 64, 66 relative to the tilt axis axles 96 (FIG. 4), while finer scale adjustment may be made by turning screw knob controls 72, 74. knob controls 72, 74 facilitated fine-scale adjustments during filming.

After tilt body balancing is completed, support or gimbal system 10, 10' is removed from its perch on Y-shaped rests 126, 128. Post 12 is aligned with a vertical projection 134 on a convex side of arcuate base 118 and gimbal system 10, 10' lowered and fixed to the projection by a locking pin 136. Then roll cradle 18 is adjusted so that the combined center of gravity of cradle 18, tilt body 20, and camera 24 is located on roll axis a2. When that balancing operation is completed, the entire assembly may be returned to rest on Y-shaped rests 126, 128 with locking fingers 130, 132 in locked configuration. A user carrying a Steadicam may then approach the docking stand 112 and attach system 10, 10' including camera to the end of the Steadicam arm, this procedure being facilitated by the arcuate geometry of base 118

Camera support or gimbal system 10, 10' may be provided with ancillary features for specialized functions. Screw knobs 138 and 140 may be provided on bearing members 60 and 62 for imposing a damping action on the swinging motion of tilt body 20, for instance, by pressing a rubber element (not shown) against tilt body axles 96 (FIG. 4). By sufficiently turning screw knobs 138, 140 a user may completely arrest the rotation of tilt body 20 and camera 24 about tilt axis a3. In addition, a spring-loaded locking bolt 142 may be provided on mounting member 16 for insertion into a hole (not illustrated) provided in rail 30 or 32 to lock cradle 18 and prevent rotation thereof about roll axis a2. Several mutually spaced holes may be provided along the length of rail 30 or 32 to enable fixation of roll cradle 18 alternately at different angular orientations about axis a2. Set screw 106 may be used to fix post 12 to a support to prevent rotation of assembly 14 about pan axis a1.

FIG. 8 shows camera support or gimbal system 10, 10' mounted to an arm 152 of a Steadicam and ready for use in filming.

In a preferred method utilizing camera support or gimbal system 10, 10', a user dons a Steadicam harness 150 that includes extendible arm 152 with a post 154 at a distal end onto or into which the user inserts post 12 of camera support 10, 10' to thereby mounting the camera support to the harness. Camera 24 is attached to tilt body 20, 20' via stage 22, 84 (see FIGS. 1 and 4), preferably before the mounting of camera support 10, 10' to the harness, in order to allow center of gravity placement and system balancing as described above with reference to FIG. 7. Camera 24 is operated to capture a series of images, and the user manually moves the gimbal assembly 14, 14' about at least one of axes a1, a2, and a3 during the operating of the camera. System 10, 10' enables a movement combining rotary motion about any combination of axes a1, a2, and a3, using one or two handgrips 50, 52 or 80, 82. Handgrips 50, 52 or 80, 82 may be used together or individually in manipulating and controlling the motion of camera 24 to produce various combinations of panning, rolling and tilting. As indicated herein, where the support 10, 10' is attached to a Steadicam arm 152, camera 24 may be translated, within limits, relative to the user or operator by means of the Steadicam, while camera support or gimbal system 10, 10' enables all manner of camera pointing or directional control.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof

What is claimed is:
1. A camera support comprising:
    a post defining a first axis, said post being disposable so that said first axis extends vertically;
    a gimbal assembly; and
    a first mounting member axially coupling said gimbal assembly to said post for rotation of said gimbal assembly in a horizontal plane about said first axis, said first mounting member and said gimbal assembly being secured to said post proximate to and along said first axis
    wherein said gimbal assembly includes:
    a first rigid body having a periphery, said first rigid body being secured along said periphery to said first mounting member for rotation in a vertical plane about a second axis perpendicular to said first axis, said periphery being disposed at a distance from said second axis;
    a second rigid body movably mounted to said first rigid body for rotation in another vertical plane about a third axis perpendicular to both said first axis and said second axis, said second rigid body being secured to said first rigid body proximate to and along said third axis;

a second mounting member connected to said second rigid body for attaching a camera to said second rigid body; and two bearing members spaced from one another along said third axis, said second rigid body being rotatably mounted by at least one axle to said bearing members for rotation of said second rigid body about said third axis;

said first rigid body including at least two arms parallel to one another and spaced from one another in a direction parallel to said third axis;

said bearing members being adjustably fixable to respective ones of said at least two arms to vary effective lengths of said at least two arms between said periphery and said bearing members in a direction transverse to said third axis for shifting a center of gravity of said first rigid body, said second rigid body and the camera relative to said second axis, thereby enabling a placement of said center of gravity on said second axis, wherein said at least one axle is configured for disposition on a rest of a docking stand to hold the camera support upon placement of the camera support on the docking stand, said at least one axle being configured to abuttingly engage said docking stand to prevent rotation of the second rigid body about the third axis.

2. The camera support defined in claim 1 wherein said gimbal assembly is configured for the application solely of manual force or torque to rotate (i) said gimbal assembly in its entirety about said first axis, (ii) said first rigid body and said second rigid body, together with the camera attached to said second rigid body, about said second axis, and (iii) said second rigid body, said second mounting member and the camera alone about said third axis, said gimbal assembly including a handgrip attached to said second rigid body for selectively applying torque to rotate same about said third axis, to rotate said first rigid body and said second rigid body together about said second axis, and for rotating said gimbal assembly about said first axis, in any combination of such rotary motions.

3. The camera support defined in claim 2, wherein said handgrip is fixedly connected to said second rigid body and rotatably connected to said first rigid body for facilitating manual rotation of said second rigid body about said third axis.

4. The camera support defined in claim 3 wherein said handgrip is operatively connected to said first rigid body in a configuration to facilitate manual rotation of said first rigid body and said second rigid body jointly about said second axis and to further facilitate manual rotation of said gimbal assembly about said first axis.

5. The camera support defined in claim 2 wherein said handgrip is connected to said second rigid body so that rotation of said handgrip about said third axis rotates said second rigid body and the camera about said third axis, so that moving said handgrip in a plane perpendicular to said first axis rotates said gimbal assembly about said first axis, and so that moving of said handgrip in a plane including said first axis rotates said first rigid body, said second rigid body and the camera about said second axis, said gimbal assembly being configured for any combination of rotation about said first axis, said second axis and said third axis in response to manipulation of said gimbal assembly via said handgrip.

6. The camera support defined in claim 1 wherein said two bearing members each has a casing, each of said at least two arms being releasably clamped to the casing of a respective one of said bearing members.

7. The camera support defined in claim 1 wherein said first mounting member has a U-shaped configuration with a base or bight part and two parallel lateral plates connected to said base or bight part along opposing sides thereof, said post being coupled to said base or bight part for rotation of said gimbal assembly about said first axis.

8. The camera support defined in claim 7 wherein each of said two parallel lateral plates is provided on a surface facing the other of said two parallel lateral plates with a plurality of rollers, said first rigid body being supported on said rollers.

9. The camera support defined in claim 1 wherein:
said second rigid body has a U-shaped configuration;
said second rigid body includes a base or bight part and at least two additional arms connected to said base or bight part at opposite ends thereof; and
said second mounting member is affixed to said second base or bight part, between said at least two additional arms.

10. The camera support defined in claim 1 wherein:
said center of gravity is a first center of gravity;
said second rigid body has at least two additional arms extending parallel to one another and spaced from one another in a direction parallel to said third axis; and
said at least two additional arms have adjustable effective positions transverse to said third axis for shifting a second center of gravity of said second rigid body and a camera mounted thereto relative to said third axis, thereby enabling a placement of said second center of gravity on said third axis.

11. The camera support defined in claim 10 wherein each of said at least two additional arms is part of a respective telescoping suspension member having a screw knob control for fine adjustment of a degree of telescoping of said suspension member.

12. A camera support comprising:
a post defining a first axis, said post being disposable so that said first axis extends vertically;
a gimbal assembly; and
a first mounting member axially coupling said gimbal assembly to said post for rotation of said gimbal assembly in a horizontal plane about said first axis, said first mounting member and said gimbal assembly being secured to said post proximate to and along said first axis wherein said gimbal assembly includes:
a first rigid body having a periphery, said first rigid body being secured along said periphery to said first mounting member for rotation in a vertical plane about a second axis perpendicular to said first axis, said periphery being disposed at a distance from said second axis;
a second rigid body movably mounted to said first rigid body for rotation in another vertical plane about a third axis perpendicular to both said first axis and said second axis, said second rigid body being secured to said first rigid body proximate to and along said third axis; and
a second mounting member connected to said second rigid body for attaching a camera to said second rigid body,
said second rigid body including two arms parallel to one another and spaced from one another in a direction parallel to said third axis,
said two arms having adjustable effective positions transverse to said third axis for shifting a center of gravity of said second rigid body and the camera relative to said third axis, thereby enabling a placement of said center of gravity on said third axis, each of said two arms being part of a respective telescoping suspension member having a screw knob control for fine adjustment of a degree of telescoping of said suspension member.

13. The camera support defined in claim 12, wherein:
said first rigid body and said second rigid body each have a U-shaped configuration, said two arms being two second arms;
said first rigid body includes a first base or bight part, two first arms being connected to said first base or bight part at opposite ends thereof;
said second rigid body includes a second base or bight part, said two second arms being connected to said second base or bight part at opposite ends thereof, said second mounting member being movably attached to said second base or bight part;
said second rigid body is smaller than said first rigid body;
said two second arms are located on mutually facing sides of said two first arms and are rotatably connected to said two first arms;
said first base or bight part includes at least one arcuate rail;
said first mounting member has a base and two parallel lateral plates;
said post is coupled to said base of said first mounting member for rotation of said gimbal assembly about said first axis;
said at least one arcuate rail is supported on a plurality of rollers; and
said at least one arcuate rail has a center of curvature located along or on said second axis.

14. A method for use in film production or photography, comprising:
providing a camera support that includes:
a post;
a gimbal assembly; and
a first mounting member coupling said gimbal assembly to said post for rotation of said gimbal assembly about a first axis coincident with a longitudinal axis of symmetry of said post,
wherein said gimbal assembly has:
a first rigid body movably secured to said first mounting member for rotation about a second axis perpendicular to said first axis; and
a second rigid body movably mounted by bearing members to said first rigid body for rotation about a third axis perpendicular to both said first axis and said second axis;
attaching a camera to said second rigid body;
providing a harness;
removably attaching said harness to an individual user, said harness including an articulated arm provided at a free end with a vertical oriented projection;
inserting said post and said projection one onto or into the other, thereby mounting said camera support to said harness;
operating said camera to capture a series of images;
manually moving said gimbal assembly about at least one of said first axis, said second axis and said third axis during the operating of said camera;
adjusting a position of said first rigid body and said bearing members relative to one another to place a combined center of gravity of said first rigid body, second rigid body and said camera in a desired location relative to said second axis; and
adjusting a position of said second rigid body and said camera relative to said third axis to place a center of gravity of said second rigid body and said camera together in a desired location relative to said third axis, the adjusting of the position of said second rigid body and said camera relative to said third axis including turning a knob to change a degree of overlap between two parts of a telescoping member.

15. The method defined in claim 14 wherein the manual moving of said gimbal assembly includes rotating said gimbal assembly simultaneously about at least two of said first axis, said second axis and said third axis during the operating of said camera.

16. The method defined in claim 14 wherein the camera support includes at least one handle or handgrip fixedly connected to said second rigid body and rotatably connected to said first rigid body, the manual moving of said gimbal assembly including grasping said at least one handle or handgrip and manipulating said at least one handle or handgrip.

17. A method for use in film production or photography, comprising:
providing a camera support that includes:
a post;
a gimbal assembly; and
a first mounting member coupling said gimbal assembly to said post for rotation of said gimbal assembly about a first axis coincident with a longitudinal axis of symmetry of said post,
wherein said gimbal assembly has:
a first rigid body movably secured to said first mounting member for rotation about a second axis perpendicular to said first axis; and
a second rigid body movably mounted to said first rigid body for rotation about a third axis perpendicular to both said first axis and said second axis;
attaching a camera to said second rigid body;
providing a harness;
removably attaching said harness to an individual user, said harness including an articulated arm provided at a free end with a vertical oriented projection;
inserting said post and said projection one onto or into the other, thereby mounting said camera support to said harness;
operating said camera to capture a series of images;
manually moving said gimbal assembly about at least one of said first axis, said second axis and said third axis during the operating of said camera; and
mounting said camera support to a docking frame, the mounting of said camera support including placing portions of said camera support and said docking frame into abutting engagement to prevent rotation of said first rigid body, said second rigid body and the camera about said second axis.

18. A method for use in film production or photography, comprising:
providing a camera support that includes:
a post;
a gimbal assembly; and
a first mounting member coupling said gimbal assembly to said post for rotation of said gimbal assembly about a first axis coincident with a longitudinal axis of symmetry of said post,
wherein said gimbal assembly has:
a first rigid body movably secured to said first mounting member for rotation about a second axis perpendicular to said first axis; and a second rigid body movably mounted by bearing members to said first rigid body for rotation about a third axis perpendicular to both said first axis and said second axis;

attaching a camera to said second rigid body;

providing a harness;

removably attaching said harness to an individual user, said harness including an articulated arm provided at a free end with a vertical oriented projection;

inserting said post and said projection one onto or into the other, thereby mounting said camera support to said harness;

operating said camera to capture a series of images;

manually moving said gimbal assembly about at least one of said first axis, said second axis and said third axis during the operating of said camera; and adjusting a position of said first rigid body and said bearing members relative to one another to place a combined center of gravity of said first rigid body, second rigid body and said camera in a desired location relative to said second axis, wherein the attaching of said camera to said second rigid body includes:

providing a docking stand;

placing said camera support on said docking stand;

placing portions of said camera support and said docking stand into abutting engagement so as to prevent rotation of said second rigid body about said third axis;

while said second rigid body is rotatably stationary relative to said docking stand by means of said abutting engagement, adjusting a position of said camera on said second rigid body;

further adjusting a position of said second rigid body relative to said third axis so that a center of gravity of said camera and said second rigid body lies on said third axis; and subsequently adjusting a position of said third axis relative to said second axis so that said combined center of gravity lies on said second axis.

* * * * *